United States Patent [19]

Harrah et al.

[11] Patent Number: 4,594,179

[45] Date of Patent: Jun. 10, 1986

[54] REDUCTION OF REABSORPTION EFFECTS IN SCINTILLATORS BY EMPLOYING SOLUTES WITH LARGE STOKES SHIFTS

[75] Inventors: Larry A. Harrah; Clifford L. Renschler, both of Albuquerque, N. Mex.

[73] Assignee: The United States of America as represented by the United States Department of Energy, Washington, D.C.

[21] Appl. No.: 636,655

[22] Filed: Aug. 1, 1984

[51] Int. Cl.$^4$ .............................................. C09K 11/06
[52] U.S. Cl. ............................ 252/301.17; 250/361 R
[58] Field of Search ................ 250/361 R; 252/301.17

[56] References Cited

U.S. PATENT DOCUMENTS

| | | | |
|---|---|---|---|
| 2,698,906 | 1/1955 | Reynolds | 250/71 |
| 2,710,284 | 6/1955 | Hyman | 252/301.17 |
| 3,314,894 | 4/1967 | Nyilas et al. | 252/301.17 |
| 3,444,089 | 5/1969 | Carter | 252/301.17 |
| 3,886,082 | 5/1975 | Hyman | 252/301.17 |
| 4,088,508 | 5/1978 | Gravisse | 252/301.17 |
| 4,292,527 | 9/1981 | Franks | 250/483 |
| 4,316,817 | 2/1982 | Cusano et al. | 252/301.17 |
| 4,359,641 | 11/1982 | Franks et al. | 252/301.17 |
| 4,374,749 | 2/1983 | Cusano et al. | 252/301.17 |
| 4,495,084 | 1/1985 | Shimuzu et al. | 252/301.17 |

OTHER PUBLICATIONS

Hallam et al., J. Phys. B. (Atom Molec. Phys.) vol. 11, No. 18, 1978, pp. 3273–3288.
Itoh et al., JACS 1982 (104) pp. 4146–4150.
Woolfe et al., JACS 1982 (103) pp. 6916–6928.

*Primary Examiner*—Arthur P. Demers
*Attorney, Agent, or Firm*—Armand McMillan; Albert Sopp; Judson R. Hightower

[57] ABSTRACT

In a radiation or high energy particle responsive system useful as a scintillator, and comprising, a first component which interacts with said radiation or high energy particle to emit photons in a certain first wavelength range; and at least one additional solute component which absorbs the photons in said first wavelength range and thereupon emits photons in another wavelength range higher than said first range;

an improvement is provided wherein at least one of said components absorbs substantially no photons in said wavelength range in which it emits photons, due to a large Stokes shift caused by an excited state intramolecular rearrangement.

18 Claims, No Drawings

REDUCTION OF REABSORPTION EFFECTS IN SCINTILLATORS BY EMPLOYING SOLUTES WITH LARGE STOKES SHIFTS

The U.S. Government has rights in this invention pursuant to Contract No. DE-AC04-76DP00789 between the U.S Department of Energy and AT&T Technologies, Inc.

BACKGROUND OF THE INVENTION

This invention relates to an improved organic scintillator system having minimized reabsorption effects and useful for the detection of high energy particles and electromagnetic radiation.

A number of plastic scintillators have been developed for the detection of high energy particles and photons, J. B. Birks, "The Theory and Practice of Scintillation Counting", (Pergamon, 1964); T. Inagaki, et al, Nucl. Instr. and Meth. 201 (1982) 511. In a typical system used for the detection of neutrons, the neutron beam interacts with the polymer matrix, elevating some of the monomer units to electronically excited states. Poly(-vinyltoluene) (PVT) is often used as the matrix material, since it contains a large number of hydrogen atoms, each of which has a good neutron cross-section. Since the phenyl rings of PVT are aromatic, a $\pi \rightarrow \pi^*$ electronic transition is induced. Liquid scintillator matrices have also been used.

Since many aromatic polymers have low quantum yields of fluorescence, I. B. Berlman, *Handbook of Fluorescence Spectra of Aromatic Molecules*, 2nd ed. (Academic, 1971), a solute such as 2-phenyl-5-(4-biphenylyl)1,3,4-oxadiazole (PBD) is often introduced. The energy of the $\pi^*$ state of PVT is then transferred to the solute, which fluoresces efficiently. Since primary solutes used for this purpose typically fluoresce at wavelengths shorter than 400 nm, secondary solutes (or "wavelength shifters") are sometimes added. Energy transfer from the primary to secondary solute results in a longer wavelength fluorescence and a better match with the wavelength of optimum response for most photomultiplier tubes.

Ternary and higher order solutes can be added to obtain further wavelength shifts. This is often necessary when using detectors which have optimum responses at much longer wavelengths, as with some photodiodes.

Typical systems include that of U.S. Pat. No. 2,710,284 a solid plastic scintillator, e.g., a vinyl aromatic polymer containing p, p'-diphenyl stilbene and p-terphenyl; USP 2,698,906-p-terphenyl in a hydrocarbon solvent; U.S. Pat. No. 4,292,527 - fiber optic radiation detection system including conventional scintillator systems; U.S. Pat. No. 4,256,900 - fluorescent azolyl benzocoumarin dyestuffs as scintillator components; U.S. Pat. No. 4,326,066—fluorescent triazolyl coumarin dyestuffs as scintillator components; and U.S. Pat. No. 2,188,115—inorganic scintillator.

Unfortunately, energy can be transferred not only from one solute to the next, but also between like molecules of the same solute. Each of these self-transfer steps, when due to the reabsorption of photons, can lead to scintillation efficiency losses. Similar losses can occur in other applications. For example, Fayer et al, R. W. Olson, et al, Appl. Optics 20 (1981) 2934, used computer simulations to predict the degree of light loss due to reabsorption effects in luminescent solar concentrators.

In a plastic scintillator, two types of transfer predominate in the movement of energy from one solute to the next. The first, radiative or "trivial" transfer, involves the emission of a photon by the donor solute and subsequent absorption by the acceptor solute. The probability of this type of transfer is increased by increasing the fluorescence quantum yield of the donor, by increasing the concentration of acceptor, by high acceptor molar absorptivity, and by good overlap between the donor emission and acceptor absorption spectra, N.J. Turro, "Modern Molecular Photochemistry", (Benjamin/-Cummings, 1978) Since this type of transfer can take place over large distances, a very high acceptor concentration is usually not required. In a large scintillator, a photon emitted in the interior will pass through a large amount of material before exiting the sample. Therefore, a high optical density can be developed, leading to efficient radiative energy transfer, even with fairly low acceptor concentrations.

The other energy transfer mode is non-radiative or Förster transfer, which involves a coulombic interaction without emission of a photon. This type of transfer is governed by the relation J. B. Birks, "Photophysics of Aromatic Molecules", (Wiley-Interscience, 1970).

$$R_o^6 = \frac{(9 \ln 10)\kappa^2 \phi_F}{128\pi^5 n^4 N'} \int_o^\infty f_M(\bar{v}) \epsilon_Q(\bar{v}) \frac{d\bar{v}}{\bar{v}^4} \quad (1)$$

where $\phi_F$ is the fluorescence yield of the donor in the absence of acceptor, $N'$ is Avogadro's number per millimole, n is the refractive index of the solution, $\epsilon_Q(\bar{v})$ is the molar absorptivity of the acceptor as a function of wavenumber, $f_M(\bar{v})$ is the emission spectrum of the donor normalized to unit area, and $\kappa$ is a factor determined by the mean relative orientations of the transition moment vectors of the donor and acceptor distributions. For random orientations in rigid media, $\kappa^2 = 0.475$, M. Z. Maksimov, et al, Optika Spec. 12 (1962) 606. The critical radius, $R_o$, is the donor-acceptor separation at which the probability of donor deactivation for Förster transfer equals the combined probabilities of all other decay routes. The rate constant for Förster transfer, k, is very strongly dependent on donor-acceptor separation.

$$k \alpha (R_o/r)^6$$

where r is the distance of separation. Since $R_o$ values of 5–30Å are typical, fairly high concentrations of donor and/or acceptor (10–100 mM) are often needed to achieve efficient transfer. Consequently, the relative rates of radiative and non-radiative transfer in a scintillator are a function of solute concentration, F. H. Krenz, Trans. Faraday Soc. 51 (1955) 172.

Considering only these three factors, increasing the concentration of each solute would be expected to increase the total transfer efficiency at each step, thereby giving a larger number of detected photons per incoming neutron. This would be true if the energy in the excited state of each solute were passed only to the solute emitting at the next longest wavelength. However, since most fluorophores have some overlap between their absorption and emission spectra, at high concentrations, self-transfer can occur by reabsorption of light emitted from a solute molecule. Each time reabsorption occurs, some quanta of energy are lost due to internal conversion and other deactivation processes (unless the fluorescence quantum yield is 1.0). Moreover, reabsorption events cause an increase in the lifetime of emission, correspondingly decreasing the time response of the scintillator. Reabsorption can also occur with the terminal solute, resulting in a loss of some photons before they can escape the scintillator. Most scintillators exhibit a maximum in their light output versus solute concentration curves. This phenomenon is probably due, in the main, to these reabsorption losses. Förster transfer can also take place between like molecules, but since the solute's excited state lifetime is unaffected, no quanta are lost.

Clearly, one way of increasing scintillator efficiency would be to use only solutes with unit fluorescence quantum efficiency. Then high solute concentrations could be used and, although reabsorption would readily occur, no deactivation would result. In practice, such solutes are rare, which makes this scheme difficult to implement.

All of the references cited above are incorporated by references herein.

As can be seen, there remains a need to improve the energy output, and compoundingly the sensitivity of organic scintillators in response to high energy particles and photons, preferably, by reducing reabsorption losses.

SUMMARY OF THE INVENTION

Accordingly, it is an object of this invention to provide organic scintillators of improved sensitivity to high energy particles and photons.

It is another object of this invention to provide such scintillators having a reduced level of reabsorption of emitted photons.

It is another object of this invention to provide a method for reducing the level of reabsorption in systems involving the photon transfer of energy of excitation from one molecular species to another, and also to provide the resultant improved systems.

Upon further study of the specification and appended claims, further objects and advantages of this invention will become apparent to those skilled in the art.

These objects have been attained by providing such systems, e.g., organic scintillators, which comprise at least one emitting species (solute) whose emission spectrum substantially does not overlap with its absorption spectrum, i.e., possesses a very large Stokes shift, i.e., a large separation between absorption and emission maxima, preferably due to an intramolecular rearrangement in its excited state.

For example, these objects have been attained by providing, in a radiation or high energy particle responsive system useful as a scintillator, and comprising, a first component which interacts with said radiation or high energy particle to emit photons in a certain first wavelength range; and at least one additional component which absorbs the photons in said first wavelength range and thereupon emits photons in another wavelength range higher than said first range;

the improvement wherein at least one of said components absorbs substantially no photons in said wavelength range in which it emits photons, due to a large Stokes shift caused by an excited state intra-molecular rearrangement, with the proviso that said component having a large Stokes shift is not methyl salicylate or salicylic acid. Preferably, the compound with the large Stokes shift is 3-hydroxyflavone.

These objects have also been attained by providing a method of detecting radiation or high energy particles comprising impinging said radiation or particles onto a system as described above.

DETAILED DISCUSSION

This invention involves the discovery that molecules which undergo an intramolecular rearrangement after absorption of photons (generally in the near UV or visible regions), have associated therewith a large Stokes shift which is very advantageous in scintillator and related systems, i.e., such molecules have a large separation between the absorption band responsible for excitation of the molecule and the corresponding emission band in which photons are reemitted by the excited molecule. In other words, the absorption and emission bands of such a molecule have substantially zero overlap. Such compounds are ideally suited as components in scintillator-type systems. Since these compounds will not reabsorb emitted photons due to the lack of overlap between the absorption and emission bands, the loss of scintillator sensitivity and efficiency due to reabsorption phenomena is eliminated or significantly ameliorated.

Of course, all molecules, including the conventional dyes employed in scintillators, will have inherent Stokes shifts since this is a basic phenomenon ongoing in all absorbing species. This invention does not involve the use of such compounds having conventional Stokes shifts in scintillator applications. Rather, it is based on the use of compounds having the unique Stokes shifts described above which provides a significantly decreased reabsorption of emitted photons in the resultant scintillator systems. In addition, although it has not heretofore been realized that compounds having the very large Stokes shifts associated with intra-molecular rearrangements in their excited states are so advantageous for use in scintillators, two such compounds have been used in the past for other reasons, i.e., methyl salicylate and salicylic acid. These compounds are also excluded from this invention as, of course, would be any other compounds which fortuitously and inherently had the necessary Stokes shift defined herein.

One compound having the necessary Stokes shift and which is prefered for use in this invention is 3-hydroxyflavone (3-HF). It has an absorption band having a maximum at 343 nm and an emission band having a maximum at 534 nm (both xylene). For this particular molecule, the large Stokes shift (10,428 cm$^{-1}$) is due to intramolecular excited state proton transfer which is both solvent and temperature dependent; see e.g. Woolfe et al, J. Am. Chem. Soc. 103, 6916 (1981) and M. Itoh, et al, J. Am. Chem. Soc. 104 (1982) 4146. In the practical temperature ranges and in the compatible solvents and/or matrix environments utilizable in scintillator applications, 3-HF will show the advantageous properties described herein. That is, because of the very low or non-existent overlap between this particular solute's absorption and emission spectra, superior scintillator sensitivities and efficiencies will result even at high concentrations.

The compound having the large Stokes shift will generally have absorption and emission maxima in the near UV region (e.g. 300–400 nm or lower) to the visible region (400–800 nm, or higher as applicable). These recited regions, of course, are non-critical but are representative of the common wavelengths involved in scintillator applications. In general, a compound having the necessary large Stokes shift based upon intramolecular rearrangement in the excited state will be employable in any scintillator application as long as one other component in the system emits photons within the absorption band of Stokes compound (e.g., where the photons emitted by the compound of this invention are themselves to be measured by a conventional detector) and/or one additional component has an absorption band overlapping with the wavelength range of the photons subsequently emitted by the compound of this invention (where longer wavelength radiation is to be detected). It is even possible that the Stokes compound of this invention can be the sole component in a scintillator, e.g., where it is desired to transfer radiation within its absorption band and to detect the same within the wavelength range of its emission band.

As usual, the normal configuration of the scintillator of this invention will be based upon a solid state organic (usually polymeric) matrix containing one or more solute components, i.e., compounds which absorb and emit protons in the necessary wavelength ranges. That is, the matrix usually has a high cross-section for interaction with the impinging electromagnetic radiation or high energy particles desired to be detected. Essentially any high energy radiation or particles can be observed as long as the primary matrix component is chosen accordingly. Typically, scintillators will be used to detect neutrons, gamma-rays, high energy electrons, x-rays, ultraviolet radiation, etc. As a result of the interaction between the matrix and the impinging radiation or high energy particles, the matrix molecules will become activated and will emit photons in a characteristic frequency range. The latter photons will then be absorbed by a solute component within the matrix. The excited solute will reemit the photons at a longer wavelength. When the latter is satisfactory for detection (e.g., where a detector of sufficient sensitivity is available), the unique compound of this invention will be used as that solute component and will be selected to have an absorption band which overlaps with the emission band of the primary matrix material. However, it is more often the case that at least one additional solute component will be contained in the matrix to absorb the photons emitted by the first solute and reemit them at yet a longer wavelength, usually more accessible with high sensitivity detectors. In this case, the unique compound of this invention can be used as either or both of these solute components. Again, the absorption and emission bands will be chosen correspondingly in accordance with conventional considerations. This same rationale will be used when one or more additional solutes are employed. In all cases, the unique components of this invention can be used as only one of the solutes or for several or all solutes, as long as compounds having the necessary absorption/emission spectra are chosen.

All of the considerations involved in making and using the scintillators of this invention are completely conventional, unless indicated otherwise herein and are discussed very thoroughly in the literature, e.g., in the several references cited herein, all of whose disclosures are incorporated by reference herein. These include the conventional selection of primary matrix constituents, compounds for use as the various solutes, the number of solutes to be employed, the concentrations of the various solutes, the fabrication of the scintillators themselves, their use in various conventional optical/ radiometric systems, etc.

For instance, solutes will always be chosen to have fluorescent yields which are as large as possible. This will minimize the light loss from reabsorption and increase overall system sensitivity. Component concentrations will be selected to optimize system sensitivity and usually will involve the performance of a few routine preliminary experiments. In general, the first solute to absorb photons (the primary solute) will be used in a concentration of about 1–2 weight percent; the second solute in a concentration of about 0.02–0.5 weight percent; and the others in correspondingly lower concentrations usually decreasing by approximately an order of magnitude from solute to solute. However, in all cases, these concentrations are not meant to be limiting but only indicative of typical concentration values. The number of solutes used is usually in the range of 1–4, preferably 2–3, most often 3.

One of the major advantages provided by this invention is the low reabsorption effects which occur even when the new high Stokes shift compound of this invention is employed in concentrations greater than those in conventional systems. Thus, the advantageous nature of the scintillators of this invention will have especially high value where high concentrations of the solute are useful, as is usually the case. For example, although the results will still be good, where thin sheets of scintillator material (e.g., about 2 mm thick), are employed, the absorption effects are minimal anyway and the advantageous nature of this invention will be less important. In other applications, however, large blocks of scintillator material are used, e.g., several tens of centimeters on a side or even larger. Upon the illumination of such high concentration scintillators by an exciting beam, the attendant reduction of reabsorption phenomena in accordance with this invention will produce a significant increase in the total light output in comparison with the value achievable with state-of-the-art devices. As can be seen, in general, the amount of unique Stokes shift component of this invention, e.g., 3-HF, can be higher than the amounts conventionally employed using prior art solutes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Rubrene was obtained from Aldrich Chemical Co. and used as received. 3-Hydroxyflavone was obtained from Pfaltz and Bauer and recrystallized twice from a 50% water/50% ethanol solution. PBD and coumarin 450 were obtained from Exciton Chemical Co., Dayton, Ohio, and used as received. Coumarin 153 was used as received from Eastman Kodak Co. Reagent grade mixed xylenes and cyclohexane were obtained from Spectrum Chemical Co., Redondo Beach, Calif., and used with no further purification. Fluorescence spectra of both solvents were run to ensure that no significant fluorescent impurities were present. Methylstyrene (vinyl-toluene) was obtained from Matheson, Coleman, and Bell, and was distilled to remove polymerization inhibitor. The distilled product was stored at −5° C. until it was used.

Fluorescence emission spectra were taken with a custom-built instrument employing an Osram 200 W high pressure Hg lamp and an excitation grating monochromator with f/4 collection optics. Right angle detection was employed through a Spex 1702 grating emission monochromator. Fluorescence was detected with an RCA 31034C photomultiplier tube. In addition, an RCA 1P28 photomultiplier tube was used behind the sample holder as a transmittance detector. Signal from the fluorescence detector was processed through an ORTEC Model 9302 amplifier discriminator and a binary counter and sent to a PDP 11/10 computer for handling and storage. Fluorescence quantum yields were determined by a method previously described, C. L. Renschler, et al, Anal. Chem., 55 (4) (1983) 798, using p-terphenyl as a standard.

Absorption spectra were taken on a Cary 17 spectrophotometer with matched 1 cm quartz cells. Except for the PBD spectra, all fluorescence and absorption measurements were taken in xylene. Xylene was used in order to mimic as closely as possible the environment in a PVT matrix. However, since the PBD absorption band overlaps the xylene band, cyclohexane was used as a solvent for PBD.

Scintillators were made by placing 40 ml of vinyl toluene along with each solute in a glass tube, followed by several freeze-pump-thaw cycles to exclude oxygen. The samples were sealed in vacuo and allowed to polymerize at 125° C. for several days. These conditions were found to work reasonably well in preventing bubble formation within the scintillators. The scintillators were transparent, with no visible evidence of phase separation or solute aggregation. Interpretation of the data given below is based on the assumption that the solutes were uniformly distributed on a microscopic scale. After cooling and removal from the tube, both ends of each scintillator were cut to form a right cylinder and the two faces were polished to a mirror-like finish. Two scintillators were made and cut to the same size, 1.5 inches in length by 1.0 inch in diameter. Each sample weighed 19.4 g.

Light output measurements were made by mounting the scintillator 5.2 cm from a General Electric U5443 source, which produces 14 MeV neutrons from a deuterium-tritium fusion reaction. The scintillator was mounted such that its longitudinal axis was normal to the neutron path. A 3 mm thick lead shield was placed between the neutron source and the scintillator to block any spurious x-rays originating in the source. One end of a fiber optic bundle with a 1 $cm^2$ total cross-section was mounted to one face of the scintillator, while the other end of the bundle was mounted to a detector system employing a photodiode with a 1 $cm^2$ cross-section (Hughes Aircraft Co.). The output of the detector was sent to a Tektronix Model 468 oscilloscope.

EXAMPLE 2

Two model scintillators were prepared. The first used 3-HF to transfer light from ca. 343 to 534 nm. The second scintillator used coumarin 450 and 153 to accomplish approximately the same transfer in two steps. 3-HF (band max. 343 nm) and coumarin 450 (~349 nm) have absorption bands in very nearly the same wavelength region. While 3-HF emits at a slightly longer wavelength (534 nm) than coumarin 153 (~484 nm), both emission spectra overlap quite well with the absorption spectrum of the terminal solute. In addition, the emission spectrum of coumarin 450 (~400 nm) has a good overlap with the absorption spectrum of coumarin 153 (~408 nm). An equal concentration of 3-HF and both coumarins, 0.84 mM, was used in the scintillators. The same initial and terminal solutes were used in both scintillators, 46 mM PBD and 0.094 mM rubrene, respectively. These concentrations are similar to those used in commercial formulations. The concentrations given are in the monomer. The values will be slightly higher in the scintillator itself due to polymerization shrinkage.

It has been shown that scintillator light output is a function of sample size and geometry, R. B. Galloway, et al, Nucl. Instr. and Meth. 199 (1982) 549; thus, the two samples were made identical in size and shape. Methods have been devised to determine absolute scintillator efficiencies, D. Clark, Nucl. Instr. and Meth. 117 (1974) 295, and different definitions of efficiency have been devised, S. S. Lutz, et al, SPIE Proceedings 288 (1981) 322, some dependent on the temporal response of the system. Here, only the relative light output of the two samples under identical steady-state conditions was determined.

Since both types of energy transfer (radiative and coulombic) are favored with higher donor fluorescence yield values and with better donor-acceptor overlap, the product of these numbers should approximately describe relative transfer efficiency. Table I shows measured $\phi_F$ values for each donor used and Table II gives the overlap integral described in Eqn. 1 for each donor-acceptor pair along with the $\phi_F$-overlap integral product. The product for transfer from PBD to coumarin 450 is a factor of 1.5 larger than the product for PBD to 3-HF transfer. The transfer product for the coumarin 153 to rubrene transition is also larger than the 3-HF - rubrene product by a factor of 2.4. In addition, the coumarin 450 - coumarin 153 transfer has a very large transfer product, as would be expected from the large overlap of the former's emission and the latter's absorption spectra.

Because of the relative sizes of these products, one would expect the transfer of energy from PBD to rubrene via the two coumarins to be more efficient than the same transfer via 3-HF.

Experimentally, however, the light output from the sample containing 3-HF is found to be ca. 9% larger than the sample containing the coumarins. The main source of light loss which accounts for this difference is probably reabsorption of coumarin 450 emission and the analogous case for coumarin 153 due in each case to a small degree of self-overlap between the respective absorption and emission spectra. The products for these self-transfer processes, as shown in Table II, are small but not insignificant relative to the other transfer processes.

TABLE I

| SOLUTE | $\phi_F$ |
| --- | --- |
| PBD | 0.84 |
| 3-HF | 0.42 |
| Coumarin 450 | 0.65 |
| Coumarin 153 | 0.74 |

TABLE II

| TRANSFER STEP | OVERLAP INTEGRAL | $\phi_F$-OVERLAP INTEGRAL PRODUCT | NORMALIZED TO COUM. 450-COUM. 450 PRODUCT |
|---|---|---|---|
| PBD-Coum. 450 | $8.7 \times 10^{-15}$ | $7.3 \times 10^{-15}$ | 15 |
| PBD-3-HF | $5.9 \times 10^{-15}$ | $5.0 \times 10^{-15}$ | 10 |
| Coum. 450–Coum. 153 | $1.9 \times 10^{-14}$ | $1.2 \times 10^{-14}$ | 24 |
| Coum. 450—Coum. 450 | $7.5 \times 10^{-16}$ | $4.9 \times 10^{-16}$ | 1.0 |
| Coum. 153—Coum. 153 | $1.2 \times 10^{-15}$ | $8.9 \times 10^{-16}$ | 1.8 |
| 3-HF—3-HF | 0.0 | 0.0 | 0.0 |
| Coum. 153-Rubrene | $2.0 \times 10^{-14}$ | $1.5 \times 10^{-14}$ | 31 |
| 3-HF—Rubrene | $1.2 \times 10^{-14}$ | $6.3 \times 10^{-15}$ | 13 |

In contrast to this, the product for 3-HF self-transfer is zero within experimental capability. For the samples containing the coumarins, self-transfer by reabsorption will be more severe at higher solute concentrations, thereby reducing the light output from these samples even further relative to those with 3-HF. Reabsorption will also become more severe in larger scintillators.

EXAMPLE 3

A plastic scintillator containing 91 mM p-terphenyl and 44 mM 3-hydroxyflavone in polystyrene was made. Light from an Hg lamp with most of its intensity at 254 nm was used to excite the sample and the emission from the sample was monitored from 250-650 nm. Only the emission spectrum of the flavone was observed (along with some Hg lines from the source). Polystyrene emission at 333 nm and terphenyl emission at 340 nm were not seen. This demonstrates that after the polystyrene absorbs the 254 nm light, the energy is transferred first to the terphenyl and then the flavone without significant intermediate emission.

The preceding examples can be repeated with similar success by substituting the generically of specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What we claim is:

1. In a radiation or high energy particle responsive system useful as a scintillator, and comprising,
a first component which interacts with said radiation or high energy particle to emit photons in a certain first wavelength range; and
at least one additional solute component which absorbs the photons in said first wavelength range and thereupon emits photons in another wavelength range higher than said first range;
the improvement wherein at least one of said components absorbs substantially no photons in said wavelength range in which it emits photons, due to a large Stokes shift caused by an excited state intramolecular rearrangement, with the proviso that said component having a large Stokes shift is not methyl salicylate or salicylic acid.

2. A system of claim 1 which is a solid organic scintillator system and said first component is a polymer forming a matrix for the other solute components, and which is responsive to radiation or high energy particles.

3. A system of claim 2 comprising two solute components, one of which is a first solute component which absorbs the photons emitted by said first component in said first wavelength range and re-emits them in a second wavelength range higher than said first range; and the other of which is a second solute component which absorbs the photons emitted by said first solute component in said second wavelength range and re-emits them in a third wavelength range higher than said second range.

4. A system of claim 3 further comprising a third solute component which absorbs the photons emitted in said third wavelength range and re-emits them in a fourth wavelength range higher than said third range.

5. A system of claim 1 wherein said component absorbing substantially no photons in said wavelength range in which it emits photons is 3-hydroxyflavone.

6. A system of claim 2 wherein said component absorbing substantially no photons in said wavelength range in which it emits photons is 3-hydroxyflavone.

7. A system of claim 3 wherein said component absorbing substantially no photons in said wavelength range in which it emits photons is 3-hydroxyflavone.

8. A system of claim 4 wherein said component absorbing substantially no photons in said wavelength range in which it emits photons is 3-hydroxyflavone.

9. A system of claim 8 wherein said first component is a matrix of polyvinyltoluene, said first solute component is 2-phenyl-5-(4-biphenyl)-1,3,4-oxadiazole, said second solute component is 3-hydroxyflavone and said third solute component is rubrene.

10. A system of claim 9 which has been exposed to neutrons.

11. A system of claim 1 wherein the absorbed and emitted photons are of an energy in the near UV to the visible region.

12. A system of claim 11 further comprising a radiation detector responsive to photons in said last wavelength range, the latter being in the range of 400-800 nm, wherein the detector is arranged to receive light emitted by said components in said last wavelength range.

13. A system of claim 4 further comprising a radiation detector responsive to photons in said last wavelength range, the latter being in the range of 400-800 nm, wherein the detector is arranged to receive light emitted by said components in said last wavelength range.

14. A system of claim 8 further comprising a radiation detector responsive to photons in said last wavelength range, the latter being in the range of 400-800 nm, wherein the detector is arranged to receive light emitted by said components in said last wavelength range.

15. A method of detecting radiation or high energy particles comprising impinging said radiation or particles onto a system of claim 1 responsive thereto and detecting the emission of photons in the highest of said wavelength ranges.

16. A method of detecting radiation or high energy particles comprising impinging said radiation or particles onto a system of claim 6 responsive thereto and detecting the emission of photons in the highest of said wavelength ranges.

17. A method of detecting radiation or high energy particles comprising impinging said radiation or particles onto a system of claim 8 responsive thereto and detecting the emission of photons in the highest of said wavelength ranges.

18. A method of detecting neutrons comprising impinging them onto a system of claim 9 and detecting the photons emitted by rubrene.

* * * * *